June 21, 1932.  J. DA C. MIRANDA  1,863,667
CRANKSHAFT AND CONNECTING ROD FOR INTERNAL COMBUSTION ENGINES
Filed May 28, 1930   2 Sheets-Sheet 2
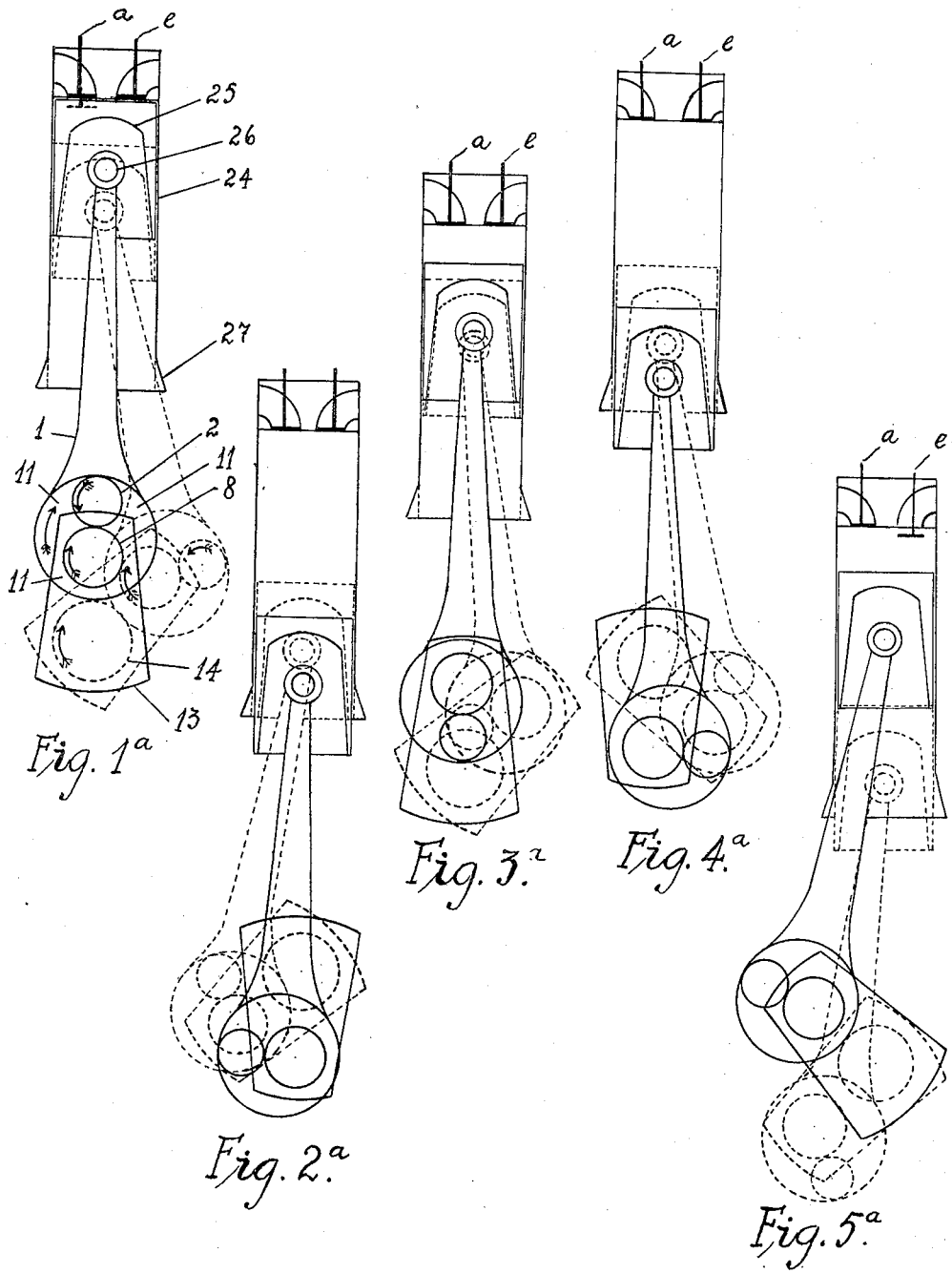

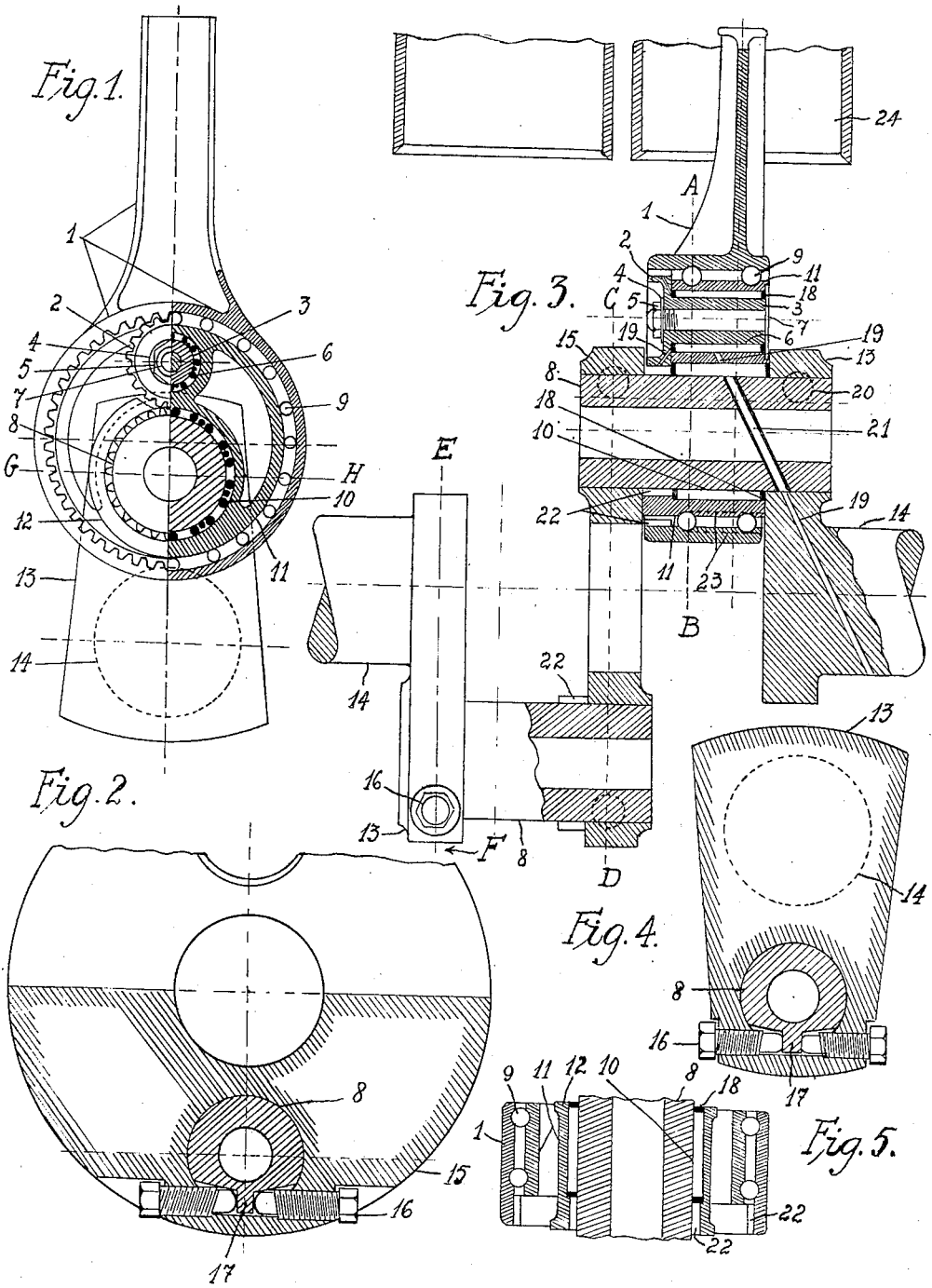

Patented June 21, 1932

1,863,667

UNITED STATES PATENT OFFICE

JUAN DA COSTA MIRANDA, OF BUENOS AIRES, ARGENTINA

CRANKSHAFT AND CONNECTING ROD FOR INTERNAL COMBUSTION ENGINES

Application filed May 28, 1930, Serial No. 456,666, and in Argentina April 9, 1930.

The invention of which the following treats relates to a new type of crankshaft and connecting rod for internal combustion motors of four cycles with valves situated in the cylinder head, the whole constructed in such a manner as to impart to the pistons, which are united through connecting rods to the crankshaft, a new secondary alternating reciprocating motion which takes place every second complete revolution of the crankshaft.

This new secondary alternating motion is designed to carry the piston in the fourth cycle completely to the top of the cylinder head, thus eliminating an explosion chamber and so totally expelling the gases remaining from the previous explosion, this ensures in the first cycle a supply of a mixture of great volume and purity. The piston, on terminating the second cycle, leaves the necessary room in the cylinder to again form the explosion chamber, whilst the third cycle is effected with a progressive reaction between the piston and the expansive force of the gases, which increases as the expansive force of the latter decreases.

For greater clearness, and for the better understanding of my invention, the following description is illustrated by various diagrams on two sheets, in which the number affixed to a part in any one diagram refers to the same number in all, thus the first sheet with its various diagrams shows part of a crankshaft, as an example of construction in accordance with my invention. The second sheet with its various diagrams shows clearly the working of the system of my invention.

In the first sheet:—

Figure I is divided into two halves, one side shows an external view of the device of this new system, whilst the other is a section on line A—B of Figure III with details of its construction and its arrangement simply as an illustrative example, for the reason that in practice these details might vary or might have to be modified according to different circumstances.

Figure II shows the balanced disc coupling between two cranks, one side of this figure being an exterior view and the other side a section on line C—D of Figure III, thus giving a general view of the method of centering and securing the parts.

Figure III is a longitudinal section of an example of the construction of the mechanism of my invention.

Figure IV is a section on line G—H of Figure I.

Figure V is a section on line E—F of Figure III, showing as in Figure II the system of centralization and the method of securing the parts.

In the second sheet:—

The five diagrams or figures on this sheet show graphically the working of this new system during the entire rotation of the four cycles: admission, compression, explosion and exhaust; and the letters (a) and (e) with which parts of the said figures are lettered indicate the admission and the exhaust valves, respectively.

As already stated the following is simply the explanation of an example of the mechanism, as the general construction could not be defined with exactitude as it would depend upon diverse factors, such as the number of cylinders the motor might have, the position of these, whether in V form or in line, the type of motor adopted, whether reciprocating or rotary, to all or any of which the principles of my invention could be applied with great advantage, I therefore limit myself to describing only that which has been demonstrated by the diagrams, and which is sufficient to clearly establish the scheme of my invention and its object.

In accordance with the foregoing, what follows describes what is shown in the diagrams of the first sheet, being a general arrangement of the construction; the method of operation is shown in the second sheet.

Between the two identical pieces 13, forged in steel or in other suitable metal, and 14, all in Figure III of the first sheet, which are respectively the webs of the crank, and the crank shaft, a disc of union and equilibrium 15 is placed, having two holes corresponding in diameter and in distance from the centre with other holes bored in the webs of crank 13.

These holes are completely cylindrical, and into them is forced a turned cylinder of steel or other suitable metal, this cylinder has round it, at a convenient height, a series of teeth 22 which are jambed against the balance disc 15, said cylinder forming the crank pin 8.

On this crank pin 8 a shoulder is cut, machined flat on both sides and corresponding in position with the centre of the width of the balanced disc 15 and the crank web 13, these flats form a shoulder with two faces 17, Figure II, against these flats two set screws 16 jamb, one on either side, which being screwed into threaded holes in the balanced disc 15 and the web 13, hold these firmly in position, at the same time allowing perfect adjustment of disc 15 and web 13 by slacking off one set screw and tightening the other as the case may be. This arrangement is shown in section in Figures II and V. On crank pin 8 the eccentric 11 is mounted by means of roller bearings 10. Side play of the roller bearing 10 is limited on one side by the toothed gear on crank pin 8 and on the other by the web of the crank 13. Side play of the eccentric 11 between the disc 15 and the web 13 is limited by the flanges 12.

On the circumference of this eccentric 11 the connecting rod 1 is mounted with ball bearings 9 between. The connecting rod 1 has on one side a series of teeth 22 cut, double in number to those of the gearing on crank pin 8. At one side of the eccentric 11 a turned steel pin 3 is fitted, on this pin, with a roller bearing 6 between, a toothed pinion 2 is mounted. This pin 3 is bored through the centre and is fitted with a machined bolt 7 having a suitable head, this bolt 7 conjointly with the roller bearing 6 regulates the lateral adjustment. This bolt 7 is secured in place by a nut 5 and safety washers 4, both fit inside a recess turned out of the face of the pinion.

The extreme width of the housing of the bearing of the connecting rod 1, the total width of the pinion 2, with its turned bolt 7, as also the eccentric 11, exclusive of the flanges in Figure I and Figure IV, should leave space on either side between the web 13 and the disc 15.

Lubrication is made by means of the holes 19, drilled obliquely, through the connecting rod end of crank 13, and the crank shaft 14, Figure III, through which oil under pressure passes from the main bearings of the crankshaft.

The crank pin 8, Figure III, has a hole drilled through obliquely, coincident with that in the connecting rod of crank 13, and having besides a small tube 21 inserted by force allowing the passage of oil from the roller bearing 10, from where it passes through another hole drilled in eccentric 11 in the form and in the position indicated in the said Figure III, and passing through adequate holes drilled in the intermediate gear goes to the exterior of this, thus maintaining the teeth of the gears constantly bathed in oil.

The crank shaft is mounted in the following manner:—

Into the balanced union disc 15 the crank pin 8 is fitted by pressure, taking care that shoulder 17 comes towards the side on which the set screws 16 butt, the edge of the teeth of the gear on crank pin 8 being forced jamb up against disc 15.

Independently the connecting rod 1 is mounted on eccentric 11, performing this operation in the same way as any ordinary double ball bearing: forcing the balls into their respective semi-circular races 23.

The intermediate gearing 2 on its roller bearing can then be mounted on eccentric 11. it being first necessary to fit in place the central adjustable pin or retaining bolt 7. When this retaining bolt is tightened it should revolve conjointly with the gearing, which latter should have suitable side play on the shaft 3.

In this way, connecting rod 1 with eccentric 11 and the intermediate gear 2 are all ready to be mounted in position on the crank pin 8, which should be done so as to time with the sparking order of the motor, it being possible notwithstanding to reduce any error to two positions. Putting the crank 8 on the top dead centre, one of these is shown in Figures I and III of the first sheet, and the other at 180° to this. In this way, two cranks placed in the same plane, the eccentrics mounted on them should be at 180° one to the other and in time with the cam shaft, that is to say, the position indicated in the diagram corresponds at the end of the fourth cycle and the cam shaft, referring to this cylinder, should be exactly in time with it.

After fitting the crank pin 8 in the disc 15 in the manner described, proceed to the mounting of eccentric 11, meshing the teeth of the intermediate gear of the crank pin 8 so as to conform with the instructions given; after this place in position the roller bearing 10 and finally put the web of the crank 13 on the crank pin, to do this requires very great force, leaving only just the necessary play between it and the flanges 12 of the eccentric 11, correcting any error of alignment that may exist between it and the centre of shaft 14 by means of the adjustable set screws 16 then locking them to secure the crank in its permanent position.

The method of working the motor is as follows:—

In this description of the method of working the numbers on the diagrams on the first and the second sheets are given indiscriminately, but always mentioning the sheet on which that figure is shown.

When the crankshaft starts to rotate, the crank pin 8, which is firmly fixed in the web 13, Figure I, of the first sheet, quite apart from the turning movement round the shaft 14 receives an impulse corresponding with the movement of the connecting rod 1. Placed between the connecting rod 1 and the crank pin 8 is the intermediate gear wheel 2 which meshes with both, in consequence when the crank pin 8 rotates towards the right hand it receives a reverse impulse towards the left hand, and, as this movement cannot be imparted to the connecting rod 1, the intermediate gear wheel 2 is forced to revolve round the gear inside the connecting rod, causing the eccentric 11 on which it is mounted to revolve to the right, see Figure I on the second sheet.

The number of teeth of the gear on the connecting rod 1 being in the proportion of two to one to those of the gear on crank pin 8, it follows that after the latter has made one complete revolution, the intermediate gear 2 has completed barely half a turn round the circumference of the connecting rod 1, thus the eccentric 11 for every turn of the crank shaft makes only one half turn round gear on the crank pin 8. It therefore follows that when the crank has twice reached the top dead centre, the eccentric 11 at one of these periods is at the top and at the other it is at the bottom, that is to say for two revolutions of the crank shaft the eccentric 11 makes only one turn round the crank pin 8, thus increasing and diminishing alternately on each stroke the radius of action of the crank 13.

This presents the following distinguishing feature, because of the fact that the crankshaft while making one complete cycle, in given space of time, increase and diminishes equally and alternatively the radius of action of crank 13, the piston 25 is compelled to make one longer and one shorter stroke during the same period of the cycle, with the result that its movements are not uniform but accelerated or retarded.

Another distinguishing feature of this system is that the period of rest on all bottom dead centres is prolonged, thus allowing the opening of the exhaust valve to be greatly retarded, the result being an increased effect from the expansive force of the gases, and as a consequence an advance in closing the admission valve by reason of the nonexistence of any motive for delaying this.

As can easily be deduced, in a motor in which this type of crank and connecting rods are used, the head of the cylinders should be flat and the heads of the valves should be sunk, so as to allow for the close approach of the piston at the end of the fourth cycle.

The diagrams on the second sheet clearly indicate in the drawings the method of operation in all its phases.

Figure Ia is marked with arrows, which indicate that the direction of rotation of all the working parts is towards the right with the exception of the intermediate gear wheel 2 which rotates towards the left.

In said Figure Ia the crank is shown on the top dead centre, and the position of the eccentric 11 indicates it to be at the end of the fourth period. As is shown the radius of action of the crank 13 is at its maximum, and, that by sending the piston 25 to the extreme top of the cylinder 24, the explosion chamber 28 is entirely eliminated, thus totally expelling all the burnt gases, under these circumstances not a vestige of them remains, nor is there any elasticity or inertia, the movement of the first period has barely started when there is a rapid fall due to the quick descent of the piston 25.

The dotted lines in Figure Ia show the positions of the working parts during the first period 45° after initiation. Figure II shows the positions with crank on the bottom dead centre delayed in consequence of arrival at the end of the first period (admission) and the dotted lines in the same figure show the positions in the second period (compression) 45° after its initiation. Here is seen the distance travelled by the piston 25 during these first 45° to be less than that travelled during the first 45° of the first period, as shown by the dotted lines in Figure Ia. In Figure IIIa the crank is shown on top dead centre during the third period (explosion) where it is clearly seen that during this period the eccentric 11 on describing a semi-circle of 180° leaves sufficient space in the head of the cylinder 24, to again form the explosion chamber 28, the dotted lines in this figure show the positions in the third period 45° after initiation.

In the said 45° of the third period it is seen that the piston 25 has travelled downwards but little, but from here begins the reaction which has already been mentioned, showing by the dotted lines in Figure IVa that at 45° before terminating this the third period, piston 25 has further to travel than that which it travelled in the first 45°, Figure IIIa. Finally the dotted lines in Figure Va show that the piston 25 at 45° after initiating the fourth period (exhaust) has hardly moved on the up stroke, the same figure showing the contrary in plain lines that at 45° before terminating the fourth period the piston 25 is effecting an accelerated exit of the exhaust gases. During the first 45° of this period, as shown by the dotted lines, it will be seen how the time on the bottom dead centre is prolonged.

I claim:

1. The combination with a multi-cylinder internal combustion engine and the connecting rods thereof, of a crank shaft, the pins thereof having teeth thereon, said connecting rods having rims, said pins being journaled eccentrically within the rims having internal teeth, and gears journaled eccentrically within the rims and meshing with the teeth of the pins and rims.

2. The combination with a multicylinder internal combustion engine and the connecting rods thereof, of a crank shaft including paired webs and balanced discs, crank pins connecting the webs and discs of each pair, and having teeth thereon, rims carried by the connecting rods, said rims having internal teeth carried thereby, the pins being journaled eccentrically within the rims, gears eccentrically journaled within the rims and meshing with the teeth of the rims and the teeth of the pins.

3. The combination with a multi-cylinder internal combustion engine and the connecting rods thereof, of a crank shaft including paired webs and balanced discs, pins connecting the webs and discs of each pair, said pins having shoulders thereon, said webs and discs each having bolts threaded therein for engaging between their opposed ends said shoulders, the connecting rods having rims encircling the pins, and gear connections between the rims and pins.

In testimony whereof I affix my signature.

JUAN DA COSTA MIRANDA.